United States Patent
Cox et al.

(10) Patent No.: US 7,426,052 B2
(45) Date of Patent: Sep. 16, 2008

(54) SYSTEM AND METHOD FOR REMOTELY BUILDING AN INFORMATION HANDLING SYSTEM MANUFACTURING IMAGE

(75) Inventors: Tim W. Cox, Austin, TX (US); Edward Batchelor, Round Rock, TX (US); Andrew L. Harris, Pflugerville, TX (US); Marc Jarvis, Belton, TX (US); Chandar Kamalanathan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 849 days.

(21) Appl. No.: 10/811,683

(22) Filed: Mar. 29, 2004

(65) Prior Publication Data

US 2005/0216912 A1    Sep. 29, 2005

(51) Int. Cl.
*G06F 15/00* (2006.01)
*G06F 9/44* (2006.01)
*G03F 3/00* (2006.01)

(52) U.S. Cl. ............. 358/1.15; 358/1.18; 358/1.6; 715/762; 717/124

(58) Field of Classification Search ........... 358/1.15, 358/1.18, 1.6, 1.9; 717/174–178, 120–121, 717/124; 707/200; 709/223, 324, 327; 703/22, 703/25; 714/31; 382/232, 243; 715/762
See application file for complete search history.

(56) References Cited

U.S. PATENT DOCUMENTS

| | | | | |
|---|---|---|---|---|
| 5,045,994 A | * | 9/1991 | Belfer et al. | 703/25 |
| 6,690,830 B1 | * | 2/2004 | Cote | 382/232 |
| 6,928,644 B1 | * | 8/2005 | Kroening et al. | 717/175 |
| 2002/0032762 A1 | | 3/2002 | Price et al. | 709/223 |
| 2002/0049966 A1 | | 4/2002 | Lin | 717/178 |
| 2002/0156877 A1 | | 10/2002 | Lu et al. | 709/221 |
| 2003/0028553 A1 | * | 2/2003 | Kondo | 707/200 |
| 2003/0158926 A1 | * | 8/2003 | Kroening | 709/223 |
| 2003/0163809 A1 | * | 8/2003 | Bantz et al. | 717/177 |
| 2003/0192043 A1 | | 10/2003 | Lin et al. | 717/178 |
| 2004/0025155 A1 | * | 2/2004 | Sedlack et al. | 717/174 |
| 2004/0205406 A1 | * | 10/2004 | Kaliappan et al. | 714/31 |

* cited by examiner

*Primary Examiner*—Edward L. Coles
*Assistant Examiner*—Charlotte M Baker
(74) *Attorney, Agent, or Firm*—Hamilton & Terrile, LLP; Robert W. Holland

(57) ABSTRACT

An information handling system image builder server associated with a manufacturer supports remote access by customers through networked communications, such as the Internet, to create images for loading on information handling systems manufactured for the customers. An image creation engine of the server accesses an image library to build an image with image components selected in accordance with customer parameters. The image is built on hardware or virtual test information handling systems interfaced with the image creation engine. Customers may remotely upload custom image components to the library, such as custom applications and settings, and remotely test the operation of the image on the test information handling systems before promoting the built image to a manufacture environment for manufacture of information handling systems with the image.

20 Claims, 2 Drawing Sheets

SYSTEM AND METHOD FOR REMOTELY BUILDING AN INFORMATION HANDLING SYSTEM MANUFACTURING IMAGE

BACKGROUND OF THE INVENTION

1. Field of the Invention

The present invention relates in general to the field of information handling system manufacture, and more particularly to a system and method for remotely building an information handling system manufacturing image.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system users have tremendous flexibility in the hardware and software configurations that they employ to perform various functions. For instance, components having different processing rates, networking modes and storage capacity are often selected to build information handling systems for performing specific functions. In addition, a variety of software applications are configured upon completion of manufacture of information handling systems so that a shipped system arrives ready to perform the intended function. However, one difficulty with the wide variety of available hardware and software configurations is that information handling system users that deploy numerous systems over a period of time often have difficulty maintaining the compatibility of the systems with each other. For this reason, large employers who purchase information handling systems in bulk, such as corporate or government entities, tend to prepare hard disc drive images in advance of the manufacture of ordered systems so that the manufacturer loads the image prior to shipment of the systems. Typically, an information technology administrator of the purchaser configures an exemplary system with a desired software configuration and then sends the hard disc drive or an image of the hard disc drive to the manufacturer. Physical copying and shipment of media containing a desired image is time consuming and susceptible to delivery and media failures. The manufacturer then assembles systems having hardware components that are compatible with the image and copies the image to each hard disc drive.

One difficulty with the ordering and building of custom images is that information handling system configuration and hard disc drive imaging are complex and time-consuming so that custom image ordering is, for practicable purposes, restricted to sophisticated purchasers. However, even sophisticated purchasers might inadvertently introduce configuration errors or even malicious programs that disrupt the manufacturing cycle. Thus, information handling system manufacturers generally must test custom images for potential errors, usually with each hardware configuration variation. Building and testing systems with custom images is generally a labor-intensive task that increases manufacturing expense and decreases manufacturing efficiency. Some applications aid in the creation and testing of custom images, such as VMWare, by creating a "virtual" information handling system in memory and providing an interface to test the operation of the virtual system. Generally, creation and testing of virtual information handling systems exceeds the expertise of typical information technology administrators who often defer the configuration and testing of ordered systems to the manufacturer.

SUMMARY OF THE INVENTION

Therefore a need has arisen for a system and method which supports remote building of images for use in manufacture of information handling systems.

In accordance with the present invention, a system and method are provided which substantially reduce the disadvantages and problems associated with previous methods and systems for building images for support of information handling system manufacture. A customer remotely accesses an information handling system manufacturer image builder through network communications, such as the Internet, to build an image at the manufacturer for use in manufacture of information handling systems for the customer.

More specifically, an image builder server accessible by the customer through the Internet builds images for manufacture of information handling systems with an image library and test information handling systems. The image library includes manufacture defined image components, such as operating systems, base images, and applications, and also includes builder defined image components associated with the customer, such as files, custom applications, custom settings and previously-ordered images. An image creation engine associated with the image builder server accepts image parameters input remotely by a customer and installs the components associated with the parameters on test information handling systems. The test information handling systems include actual hardware systems having compatible hardware configurations and virtual systems generated in memory to simulate an actual hardware system. The image creation engine builds an image on the test systems and copies the built image to save to the library for subsequent use in manufacture of information handling systems or generation of variations of the image. The image builder server also supports remote editing of existing images, testing of images installed on test systems, promotion of images for use in manufacture and management by a customer of that customer's builder defined image components.

The present invention provides a number of important technical advantages. One example of an important technical advantage is that remote building of an image at a manufacturer site reduces the time and complexity of creating an image. For instance, images are created locally and stored at the manufacture site to preclude the need for customers to copy and ship media with the image to the manufacturer. Quality control for manufacture of systems is improved with selection of components for the image limited to a library controlled by the manufacturer, thus reducing the risk of improperly configured images or the introduction of malicious programs. The ready availability of virtual information handling systems to build and test images reduces delays in building and promoting images, such as through the use of manual labor to prepare comparable hardware systems, and is essentially invisible to customers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Remote building of an information handling system image by a customer at a manufacturer through networked communication reduces the complexity of testing and manufacture of customized information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
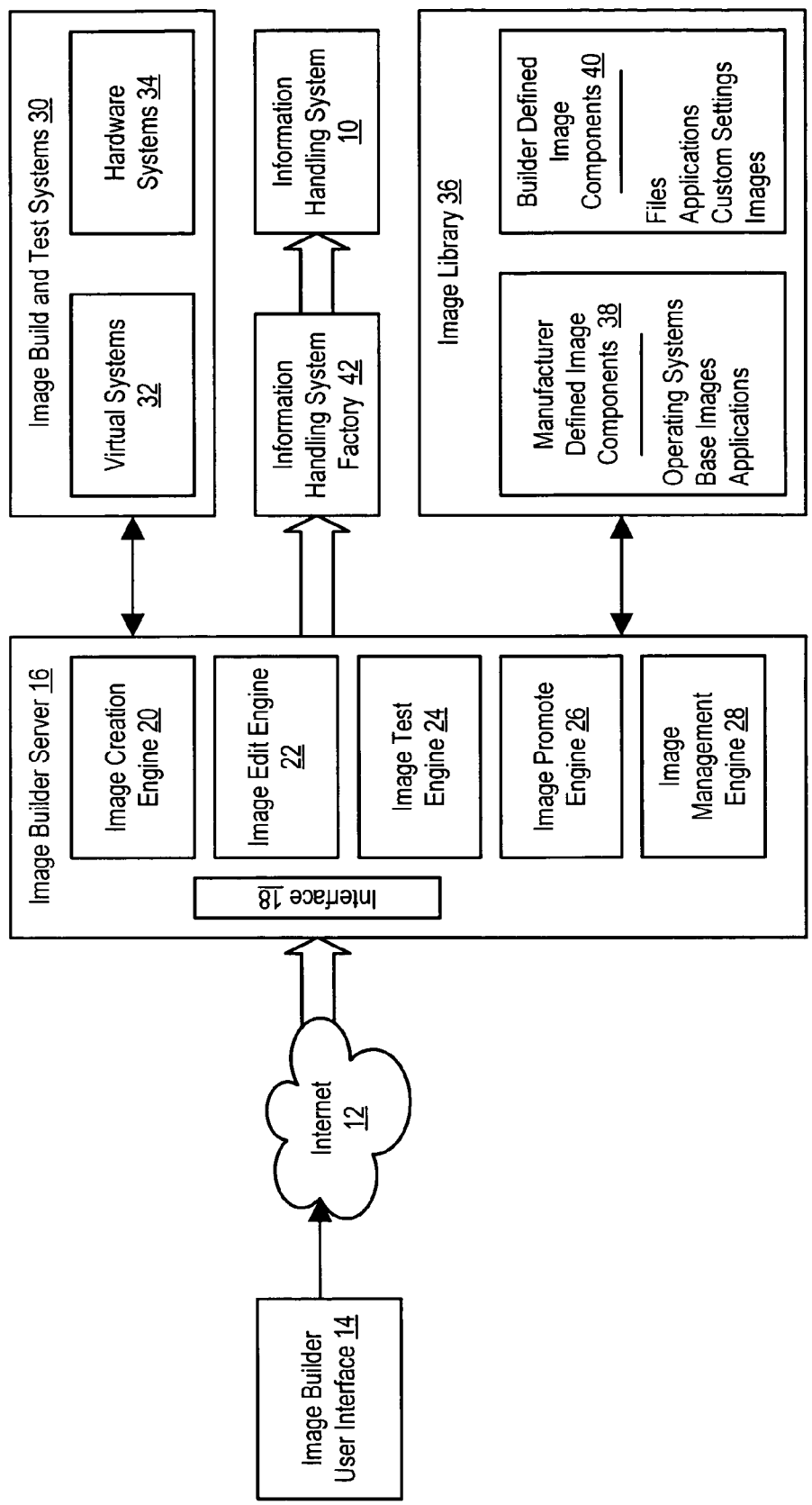
FIG. 1 depicts a block diagram of a system for remote building of an information handling system image.

Referring now to FIG. 1, a block diagram depicts a system for remote building by a customer of an image for use in manufactured information handling systems 10. The customer remotely accesses the manufacturer location through networked communications 12, such as the Internet or an intranet, with an image builder user interface 14. Customer interaction with the manufacturer location is managed through an image builder server 16 having a network interface 18, such as a security subsystem and firewall to restrict unauthorized access. Image builder server 16 presents user interface information formatted for use by a web browser, such as HTML pages.

Image builder server 16 includes a number of functional modules that interact with image build and test information handling systems 30 and an image library 36 within the manufacturer location to create images for use in manufacture of information handling systems 10. An image creation engine 20 accepts image parameters remotely input from the customer with image builder user interface 14 and applies the parameters to image library 36 to assemble image components associated with the parameters to an image build and test information handling system 30. For example, image creation engine allows selection through image builder user interface 14 of manufacturer defined image components 38 or builder defined image components 40. Manufacturer defined image components 38 include operating systems, base images and applications. The manufacturer defined base images provide a building block approach with a variety of base images having different combinations of commonly selected operating systems and applications for use with commonly used hardware components. Builder defined image components 40 include files, applications, custom settings and images defined for a particular customer, such as images previously developed by the customer. Custom settings for a particular customer include but are not limited to hard disc drive partition definitions, BIOS settings, network settings, desktop settings, system names, and registry entries.

Once a customer remotely defines image parameters, an image manifest is locally created and stored so that the image can be recreated upon demand. Image creation engine 20 uses the image manifest to select associated components from image library 36 for installation on image build and test information handling systems 30. For example, the selected components are installed on a virtual system 32 created in memory or an actual hardware-compatible information handling system 34 interfaced with the image builder server. Image creation engine 20 formats and partitions the hard disc drive, whether hardware or virtual, loads a multi-platform capable base image that includes all appropriate HALs, drivers and an operating system, configures the operating system, loads and configures selected applications, applies network, desktop, user policy, BIOS and other settings and then makes the image available to the user for test. Once build and test information handling system 30's installation and configuration is complete, image creation engine 20 copies the image of the hard disc drive of build and test system 30 to image library 36 as a builder defined image component 40 available for subsequent use in manufacture of an information handling system 10.

Image builder server 16 includes an image edit engine that supports editing of base images to adapt to desired changes input through image builder user interface 14. For instance, a customer may build a new image for use in manufacture by editing a manufacturer base image or previously built customer image stored in image library, such as is disclosed by U.S. patent application Ser. No. 10/317,871, entitled "Platform Independent Imaging Method and System" filed on Dec. 12, 2002 and incorporated herein by reference. An image test engine 24 incorporated in image builder server 16 interfaces with virtual systems 32 and hardware systems 34 to allow remote test commands of information handling systems having a selected image loaded. An image promotion engine 26 allows a customer to promote a selected image to an information handling system factory manufacturing environment 42 to manufacture information handling systems 10 with the image. An image management engine 28 allows a customer to manage the builder defined image components 40 within image library 36, such as allowing uploading of customer-specific files, applications and settings for inclusion in images and saving or deleting previously created images.

Figure 2:
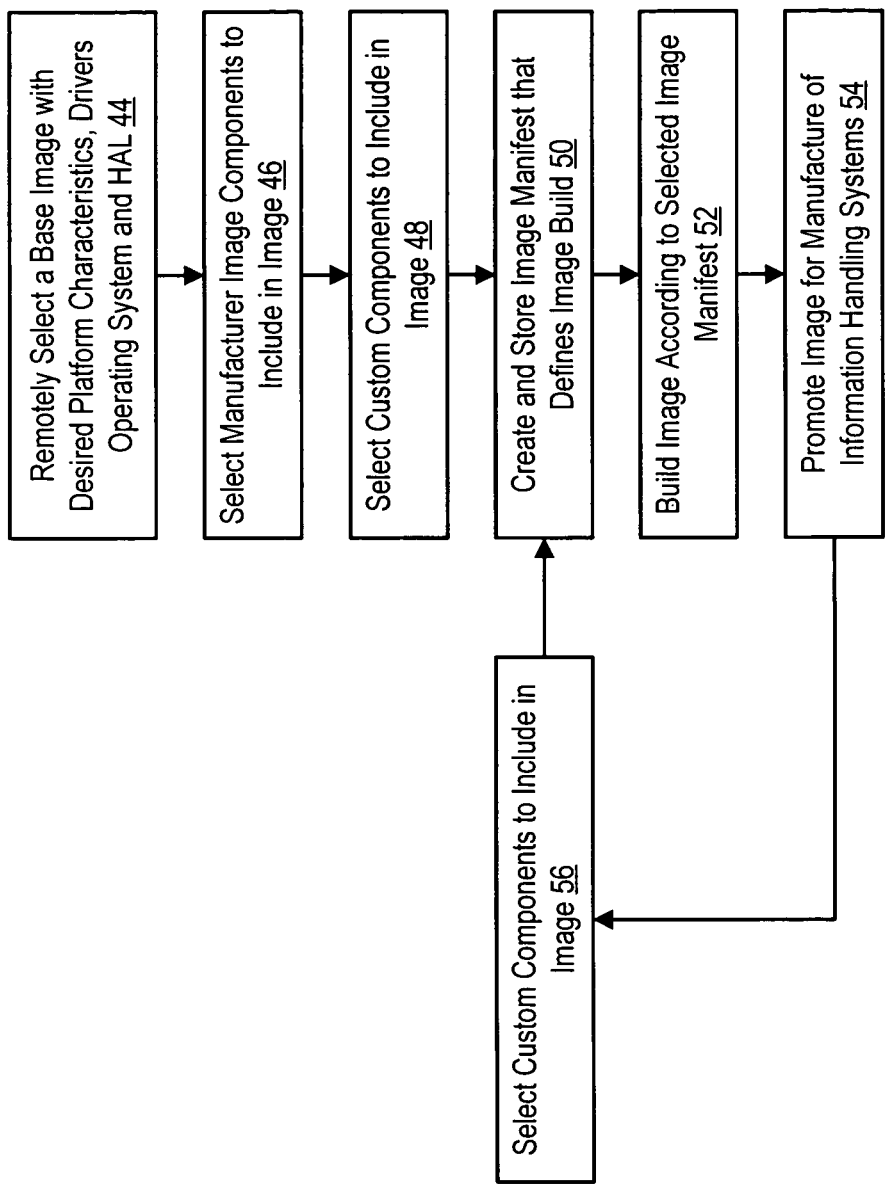
FIG. 2 depicts a flow diagram of a process for remote building of an information handling system image.

Referring now to FIG. 2, a flow diagram depicts a process for remote building of an information handling system image. The process begins at step 44 with the remote selection of a base image having the desired platform characteristics, drivers, operating system and HAL. At step 46, the manufacturer components are selected for inclusion in the image, and at step 48, the custom components are selected for inclusion in the image. Once all of the base image, manufacturer components and custom components are remotely selected, at step

50 an image manifest is created and stored on local storage. An image wizard accepts remotely inputted parameters from the customer for defining the image, such as hard disc drive partitions, power management, network setup, desktop setup, BIOS setup, and customer policies. The image manifest defines the image build components and the build process without requiring an image to be built and saved, thus reducing the storage space needed and allowing subsequent editing of the image manifest to define modifications to the image. At step 52, the image is built according to the image manifest by creating the image on a local hard disc drive according to the definitions set forth in the image manifest. At step 54, the built image is promoted to the factory for manufacture of information handling systems that have the built image copied to their hard disc drives. For instance, the built image is communicated by an FTP transfer to a factory server or, alternatively, copied to one or more optical media, such as CD or DVD optical media readable by manufactured information handling systems. In the event that a customer desires a modification to the image, at step 56 the image manifest is edited to modify the image as desired, at step 50 the edited image manifest is stored and, at step 52 the modified image is created. Customers are thus provided with a considerable degree of flexibility in the remote management of customized images that can be modified as necessary to meet desired customer goals.

Although the present invention has been described in detail, it should be understood that various changes, substitutions and alterations can be made hereto without departing from the spirit and scope of the invention as defined by the appended claims.

What is claimed is:

1. A system for remotely building an image to manufacture information handling systems, the system comprising:
    an interface operable to accept image parameters from a builder through the Internet;
    an image library having plural image components;
    an image creation engine operable to apply the image parameters to select associated image components from the image library to build an image conforming with the parameters; and
    image build and test systems interfaced with the image creation engine and operable to accept the library components to generate an information handling system having the built image.

2. The system of claim 1 wherein the image build and test systems comprise hardware information handling systems built to accept the image.

3. The system of claim 1 wherein the image build and test systems comprise software virtual information handling systems built to accept the image.

4. The system of claim 1 wherein the image library comprises information handling system manufacturer defined image components and builder defined image components.

5. The system of claim 4 wherein the manufacturer defined image components comprise one or more of operating systems, base images and applications.

6. The system of claim 4 wherein the builder defined image components comprise one or more of builder-uploaded files, applications, and custom settings.

7. The system of claim 6 wherein the builder defined custom settings comprise hard disc drive partitions, BIOS settings, network settings, desktop settings, system names and registry entries.

8. The system of claim 1 further comprising an image test engine operable to accept test commands communicated through the Internet and to apply the test commands to the image build and test systems.

9. The system of claim 1 further comprising an image promotion engine operable to communicate a copy of the built image to an information handling system manufacturing site for manufacture of information handling systems having the built image.

10. The system of claim 1 further comprising an image management engine operable to accept builder defined image components through the Internet and to copy the builder defined image components to the image library.

11. A method for remotely building an image to manufacture information handling systems, the method comprising:
    accessing a library of plural image components by a customer through a remote network communication;
    selecting image components for inclusion in manufactured information handling systems;
    defining an image manifest with the selected components;
    building an image from the image manifest on a test information handling system; and
    copying the built image from the test information handling system for use in manufacture of the information handling systems.

12. The method of claim 11 further comprising:
    promoting the built image to an information handling system manufacture environment; and
    copying the built image to a manufactured information handling system.

13. The method of claim 11 further comprising:
    accessing the test information handling system by the customer through the remote network connection; and
    testing operation of the image on the test information handling system.

14. The method of claim 13 wherein the test information handling system comprises a hardware information handling system having the image loaded.

15. The method of claim 13 wherein the test information handling system comprises a virtual information handling system modeled in network-accessible memory.

16. The method of claim 11 further comprising:
    uploading to the image library from the customer through the remote network communications one or more custom image components; and
    including the custom image components in the image manifest.

17. The method of claim 16 wherein the custom image components comprise one or more custom applications operable to perform a desired function on a manufactured information handling system.

18. The method of claim 16 wherein the custom image components comprise custom information handling system settings.

19. The method of claim 18 wherein the custom information handling system settings comprise one or more of hard disc drive partitions, BIOS settings, network settings, desktop settings, system names and registry entries.

20. The method of claim 11 further comprising:
    storing the built image in the library; and
    creating a new image by editing the stored built image.

* * * * *